US009501387B2

(12) United States Patent
Cao et al.

(10) Patent No.: US 9,501,387 B2
(45) Date of Patent: *Nov. 22, 2016

(54) TEST CASES GENERATION FOR DIFFERENT TEST TYPES

(71) Applicant: International Business Machines Corporation, Armonk, NY (US)

(72) Inventors: Shu X. Cao, Haidian District Beijing (CN); Xue F. Gao, Haidian District Beijing (CN); De Shuo Kong, Chang Ping District Beijing (CN)

(73) Assignee: International Business Machines Corporation, Armonk, NY (US)

( * ) Notice: Subject to any disclaimer, the term of this patent is extended or adjusted under 35 U.S.C. 154(b) by 27 days.

This patent is subject to a terminal disclaimer.

(21) Appl. No.: 14/509,173

(22) Filed: Oct. 8, 2014

(65) Prior Publication Data

US 2015/0026524 A1 Jan. 22, 2015

Related U.S. Application Data (63) Continuation of application No. 13/342,280, filed on Jan. 3, 2012, now Pat. No. 8,914,676.

(30) Foreign Application Priority Data

Jan. 28, 2011 (CN) .......................... 2011 1 0035143

(51) Int. Cl.
*G06F 11/00* (2006.01)
*G06F 11/36* (2006.01)
*G06F 11/263* (2006.01)

(52) U.S. Cl.
CPC ......... *G06F 11/3684* (2013.01); *G06F 11/263* (2013.01)

(58) Field of Classification Search
None
See application file for complete search history.

(56) References Cited

U.S. PATENT DOCUMENTS

| | | | |
|---|---|---|---|
| 5,703,885 | A | 12/1997 | Sun et al. |
| 5,892,947 | A | 4/1999 | DeLong et al. |
| 6,002,869 | A | 12/1999 | Hinckley |
| 6,038,378 | A | 3/2000 | Kita et al. |
| 7,590,973 | B1 | 9/2009 | Barry et al. |
| 7,895,565 | B1 | 2/2011 | Hudgons et al. |
| 8,914,676 | B2 | 12/2014 | Cao et al. |
| 2005/0114838 | A1 | 5/2005 | Stobie et al. |
| 2005/0177773 | A1 | 8/2005 | Hadley et al. |
| 2007/0162894 | A1 | 7/2007 | Noller et al. |
| 2008/0244321 | A1 | 10/2008 | Kelso |

(Continued)

OTHER PUBLICATIONS

Henderson, Paul; What's New in Wind River Test Management 3.3? http://blogs.windriver.com/henderson/2010/06 . . . ; Jun. 9, 2010; retrieved from the Internet Oct. 28, 2010; 4 pages.

(Continued)

*Primary Examiner* — Gabriel Chu
(74) *Attorney, Agent, or Firm* — Schmeiser, Olsen & Watts, LLP; John Pivnichny (57) ABSTRACT

A method and system for generating test cases of different types for testing an application. A functional flow of the application is created. The test cases are generated, based on at least one test case generation rule and additional test information corresponding to different stages of the functional flow with respect to at least two test types.

17 Claims, 6 Drawing Sheets

(56) References Cited

U.S. PATENT DOCUMENTS

| | | |
|---|---|---|
| 2009/0307763 A1 | 12/2009 | Rawlins et al. |
| 2010/0057693 A1 | 3/2010 | Himstedt et al. |
| 2010/0146514 A1 | 6/2010 | Alexander et al. |
| 2010/0180260 A1 | 7/2010 | Chikkadevaiah et al. |
| 2013/0145250 A1 | 6/2013 | Neumueller et al. |

OTHER PUBLICATIONS

Prasanna, M., et al.; A Survey on Automatic Test Case Generation, Academic Open Internet Journal; www.acadjournal.com; vol. 15, 2005; 6 pages.

Web Application Testing Tool Features; WebUI Test Studio Developer Edition; http://www.telerik.com/automated-testing-tools/products/webui-test-studi . . . ; retrieved from the Internet Oct. 28, 2010; 9 pages.

VectorCAST/C++ integrated utilities: PhaedruS SystemS; 2009; 9 pages.

Zhang Mei, et al., Automated Test Case Generation Based on UML Activity Diagram Model, Aug. 31, 2001, vol. 27, No. 4 (English Abstract), 7 pages.

Examiner's Amendment (Sep. 24, 2014) for U.S. Appl. No. 13/342,280, filed Jan. 3, 2012.

Notice of Allowance (Aug. 7, 2014) for U.S. Appl. No. 13/342,280, filed Jan. 3, 2012.

Final Amendent (Aug. 1, 2014) for U.S. Appl. No. 13/342,280, filed Jan. 3, 2012.

Final Office Action (May 2, 2014) for U.S. Appl. No. 13/342,280, filed Jan. 3, 2012.

Amendment (Apr. 11, 2014) for U.S. Appl. No. 13/342,280, filed Jan. 3, 2012.

Office Action (Jan. 15, 2014) for U.S. Appl. No. 13/342,280, filed Jan. 3, 2012.

TEST CASES GENERATION FOR DIFFERENT TEST TYPES

This application is a continuation application claiming priority to Ser. No. 13/342,280, filed Jan. 3, 2012, now U.S. Pat. No. 8,914,676, issued Dec. 16, 2014.

FIELD OF THE INVENTION

The present invention relates to data processing, and more specifically, to a method, a system, a computer program product, and an apparatus for generating test cases for different test types with respect to an application to be tested.

BACKGROUND OF THE INVENTION

With the development of computer technology, various kinds of applications based on hardware technology and software technology have provided convenient support for human work and life. Before these applications are put into normal usage, how to ensure that they will completely satisfy the standards as desired by designers and developers has become a special trend of research.

Nowadays it is generally recognized that a test is a procedure of using manual or automatic tools to run and test a certain system, for the purpose of verifying whether the system satisfies specified requirements or checking the difference between a desired result and an actual result. Hence, it can be seen that tests are intended to determine whether requirements are satisfied.

Unfortunately, solutions in the prior art for test cases with respect to different test types are likely to cause waste of manpower, material resources, and time.

SUMMARY OF THE INVENTION

The present invention provides a method for generating test cases of different types for testing an application, comprising:

creating, by a processor of a data processing system, a functional flow of the application based on a system design of the application;

said processor generating additional test information corresponding to different stages of the functional flow with respect to a plurality of test types, said generating additional test information comprising utilizing templates associated with the test types of the plurality of test types; and said processor generating the test cases based on the additional test information and at least one test case generation rule, said test cases of different types being associated with one another.

The present invention provides a data processing system comprising a processor, a memory coupled to the processor, and a computer readable storage device containing program code configured to be executed by the processor via the memory to implement a method for generating test cases of different types for testing an application, said method comprising:

said processor creating a functional flow of the application based on a system design of the application;

said processor generating additional test information corresponding to different stages of the functional flow with respect to a plurality of test types, said generating additional test information comprising utilizing templates associated with the test types of the plurality of test types; and said processor generating the test cases based on the additional test information and at least one test case generation rule, said test cases of different types being associated with one another.

The present invention provides a computer program product, comprising a computer readable storage device having computer readable program code stored therein, said program code configured to be executed by a processor of a data processing system to implement a method for generating test cases of different types for testing an application, said method comprising:

said processor creating a functional flow of the application based on a system design of the application;

said processor generating additional test information corresponding to different stages of the functional flow with respect to a plurality of test types, said generating additional test information comprising utilizing templates associated with the test types of the plurality of test types; and said processor generating the test cases based on the additional test information and at least one test case generation rule, said test cases of different types being associated with one another.

BRIEF DESCRIPTION OF THE DRAWINGS

Features, advantages, and other aspects of embodiments of the present invention will become more apparent from the following detailed description, when taken in conjunction with the figures.

DETAILED DESCRIPTION OF THE INVENTION

More detailed description will be presented below of embodiments of the present invention by referring to the figures.

The flowcharts and block diagrams in the figures illustrate the system, methods, as well as architecture, functions and operations executable by a computer program product according to various embodiments of the present invention. In this regard, each step in the flowcharts or block diagrams may represent a module, a program segment, or a part of code, which contains one or more executable instructions for performing specified logic functions. It should be noted that in some alternative implementations, functions indicated in steps may occur in an order differing from the order as shown in the figures. For example, two steps shown consecutively may be performed in parallel substantially or in an inverse order sometimes, which depends on the functions involved. It should be further noted that each block and a combination of blocks in the block diagrams or flowchart may be implemented by a dedicated, hardware-based system for performing specified functions or operations or by a combination of dedicated hardware and computer instructions.

Figure 1:
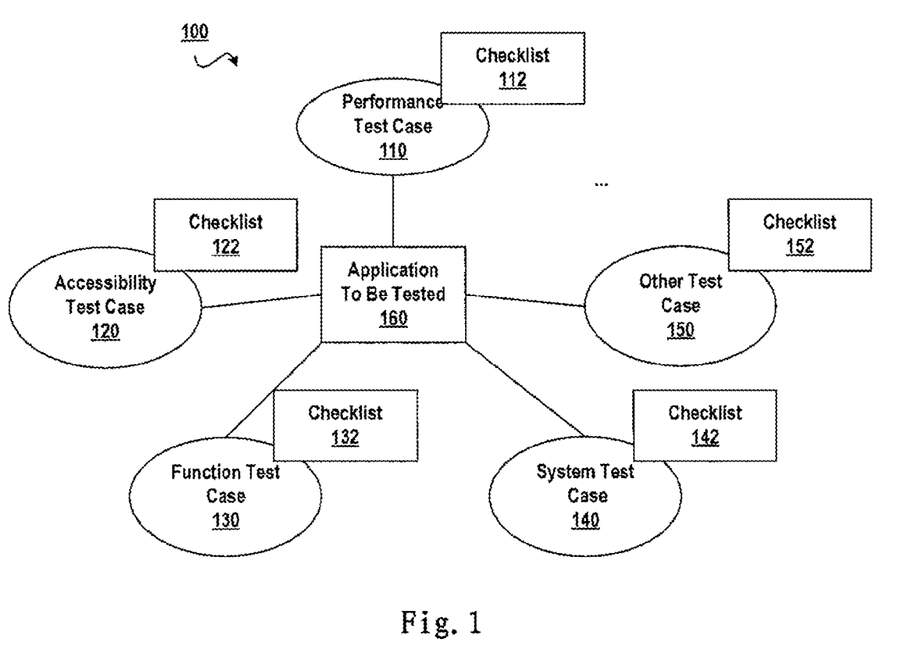
FIG. 1 schematically illustrates a block diagram of a method of generating test cases for different test types according to the prior art.

Referring to FIG. 1, this figure schematically illustrates a block diagram 100 of a method of generating test cases for different test types according to the prior art. In the prior art, different types of tests need to be performed on an application to be tested; for each test type, a checklist needs to be designed that defines a plurality of verification points, which verification points are objects to be verified when performing a corresponding type of tests. During a test, verification points in a checklist need to be verified one by one. As illustrated in FIG. 1, during testing an application to be tested, it is necessary to separately design a performance test case 110 for a performance test and a related checklist 112, an accessibility test case 120 for an accessibility test and a related checklist 122, a function test case 130 for a function test and a related checklist 132, a system test case 130 for a system test and a related checklist 142, and a test case 150 for other test type and a related checklist 152.

It should be understood that the method of generating test cases as illustrated in FIG. 1 causes resource waste. By only taking a function test, a performance test, and an accessibility test for example, illustration is presented of a possibility that reusability exists among test cases for different test types. In brief, a function test generally means verifying whether an application to be tested can accomplish a desired design function; a performance test generally means verifying whether an application to be tested can respond within a desired time; and an accessibility test may mean verifying whether the interface design or voice prompt of a system to be tested is user-friendly and convenient for users to use.

Now by taking an Automatic Teller Machine (ATM) for example, illustration is presented of drawbacks in the prior solution illustrated in FIG. 1. In a scenario that a user is waiting for a response from an ATM after inserting a card into the ATM, it may be deemed that a function test means testing whether the ATM proceeds to an expected password key-in page after accepting the insertion of the bank card, that a performance test means testing whether a response time of the ATM satisfies design requirements, and that an accessibility test means testing whether the ATM plays voice prompt instructing the user to key in the password after the card is inserted. During practical tests, the above performance test and the accessibility test cannot exist independently of an application scenario where a user inserts the card and waits for response from the ATM. That is, test cases for the function test, the performance test, and the accessibility test may share some test steps, and the difference among them lies in the verification points in checklists for different tests. In the above example, a verification point in the performance test may be that the ATM response time is no longer than 3 seconds after the user inserts the card; a verification point in the accessibility test may be whether voice prompt is played for instructing the user to key in the password.

In the above example, although the three test types share some test steps to a great extent, it is still necessary to repeatedly design test cases and corresponding checklists for different test types according to the method illustrated in FIG. 1. This causes waste of manpower, material resources, time and so on.

In addition, it is difficult for users to associate test cases for different test types. For example, the above performance test case, function test case, and accessibility test case have an association among them; i.e., they need to perform the same operations. However, in the existing method of designing test cases, test cases are independent of one another, and testers need to mentally understand the correlation among the test cases. Hence, it will also cause waste of manpower, material resources, and time during performing a specific test.

The inventors of the present invention realize that, although test cases for different test types are designed from different perspectives, the test cases are associated with one another because a desired objective of an application to be tested remains the same; these test cases verify, from different angles, whether the application to be tested satisfies a desired criterion. Hence, test cases for different test types might share some test steps; how to share these test steps and improve reusability of test cases in tests of different test types has become a tough issue during designing, storing, and executing these test cases. The present invention utilizes the idea of sharing experience and reusing resources to provide a method, a data processing system, a computer program product, and an apparatus for generating test cases for different test types with respect to an application to be tested. The test cases for different test types with respect to an application to be tested are generated on the premise of reusing existing configuration as much as possible. To this end, there is provided a method of and an apparatus for generating test cases that conform to a generation rule based on additional test information for different test types, as well as a related computer program product.

In one embodiment, there is provided a method of generating test cases for an application, the method comprising: creating a functional flow of the application based on a system design of the application; generating additional test information corresponding to stages of the functional flow with respect to at least one test type; and generating test cases based on the additional test information and a test case generation rule.

According to another embodiment of the present invention, the generating additional test information corresponding to stages of the functional flow comprises generating additional test information corresponding to stages of the functional flow based on a template associated with the at least one test type.

According to another embodiment of the present invention, the creating a functional flow of the application based on a system design of the application comprises abstracting the application as at least one data node, at least one activity node, and a relationship between the at least one data node and the at least one activity node.

According to another embodiment of the present invention, there is provided an apparatus for generating test cases for an application, the apparatus comprising: means for generating additional test information corresponding to stages of the functional flow with respect to at least one test type; and means for generating test cases based on the additional test information and a test case generation rule.

According to another embodiment of the present invention, the means for generating additional test information corresponding to stages of the functional flow comprises means for generating additional test information corresponding to stages of the functional flow based on a template associated with the at least one test type.

According to a further embodiment of the present invention, the means for creating a functional flow of the application based on a system design of the application comprises means for abstracting the application as at least one data node, at least one activity node, and a relationship between the at least one data node and the at least one activity node.

By using embodiments of the present invention, the problem of reusing test cases during a testing procedure is solved. It is possible to manage operations of designing test cases in a standardized flow based on the previous best practice and experience, and to continuously accumulate experience and perfect content of a knowledge base during testing different applications to be tested.

Figure 2:
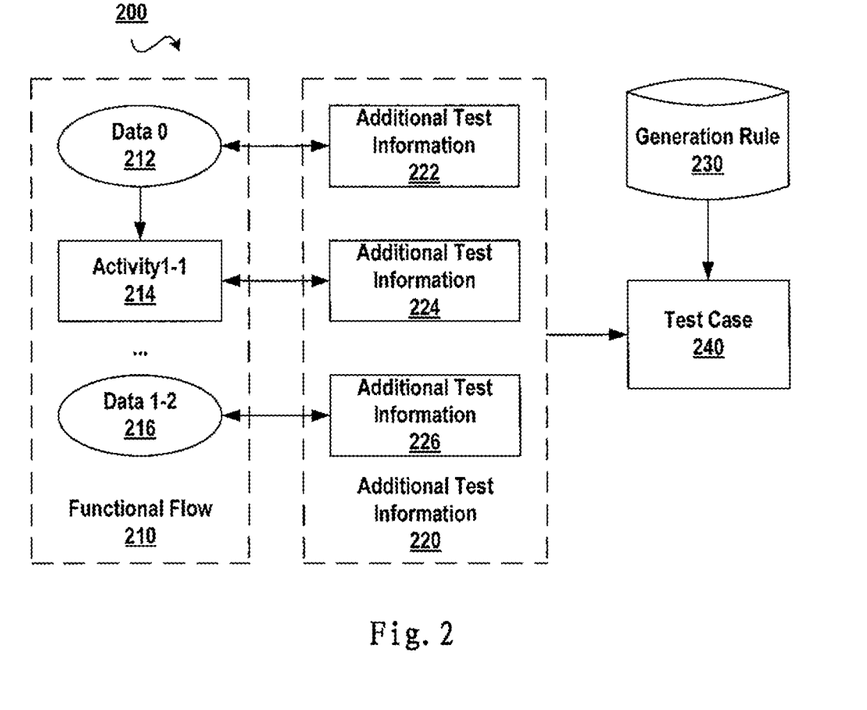
FIG. 2 schematically illustrates a data flow of generating test cases for different test types with respect to an application to be tested according to embodiments of the present invention.

Hereinafter, the detailed description is further presented for embodiments of the present invention with reference to FIGS. 2-6. First of all, principles of one embodiment of the present invention are explained with reference to FIG. 2. As illustrated in FIG. 2, this figure schematically illustrates a data flow 200 of generating test cases for different test types with respect to an application to be tested according to one embodiment of the present invention. Different types of tests have different focuses. In one embodiment, a concrete functional flow of an application to be tested is determined first, and based thereon further operations are then performed for different test types, for example, designing verification points covering all branches of the functional flow.

As illustrated in FIG. 2, after a functional flow 210 of the application to be tested is obtained through analysis, for different test types, criteria that are to be satisfied by an application to be tested in each type test are designed from different perspectives (e.g., verification points to be verified and related data), which correspond to additional test information 220 illustrated in FIG. 2. It should be noted that verification points are associated with the functional flow of an application to be tested, and different verification points are to be tested at different stages of the flow. The additional test information 220 illustrated in FIG. 2 may comprise additional test information for different stages of the functional flow, such as additional test information 222, additional test information 224, additional test information 226, etc. Since the additional test information 220 has recorded criteria that are to be satisfied by the application to be tested in respective steps, test cases 240 for different test types may be generated based on the additional test information 220 and a generation rule 230.

According to the method of one embodiment of the present invention, test cases of different types are generated based on a functional flow of an application to be tested. Hence, test cases of different types are associated with one another, rather than being isolated from one another in the prior art. In this way, during designing test cases, testers may focus their attention on the test itself, rather than on understanding the flow of the application to be tested.

Description will be presented below of a method and apparatus according to one embodiment of the present invention by taking an ATM as a concrete example of an application to be tested. It should be noted that according to embodiments of the present invention, an application to be tested may comprise any application that accomplishes particular desired functions based on software, hardware, and a combination thereof, and the purpose of using an ATM as an illustrative embodiment is to illustrate how to generate test cases for different test types in an operational flow of an Automatic Teller Machine, which is well known to people.

Now a brief introduction is made to an application scenario of an ATM. A certain amount of cash is deposited in the ATM, and a user may insert a bank card into the ATM and make a withdrawal or deposit after passing the password verification. When developing the ATM, developers have taken into consideration circumstances that may possibly occur in practical application. For example, a user keys in a correct or wrong password, a user chooses to withdraw different amounts of cash, the times for a user to make withdrawals/deposits, how many ATMs in one bank are operated simultaneously, etc.

In view of the above circumstances, various types of tests may exist when testing an ATM: an accessibility test with respect to each new user interface that appears during a user operation; a function test in case of data changes (for example, a user deposit or withdrawal causes a change in the current balance of the user and the cash balance of the ATM); a performance test for each operation, etc.

Figure 3:
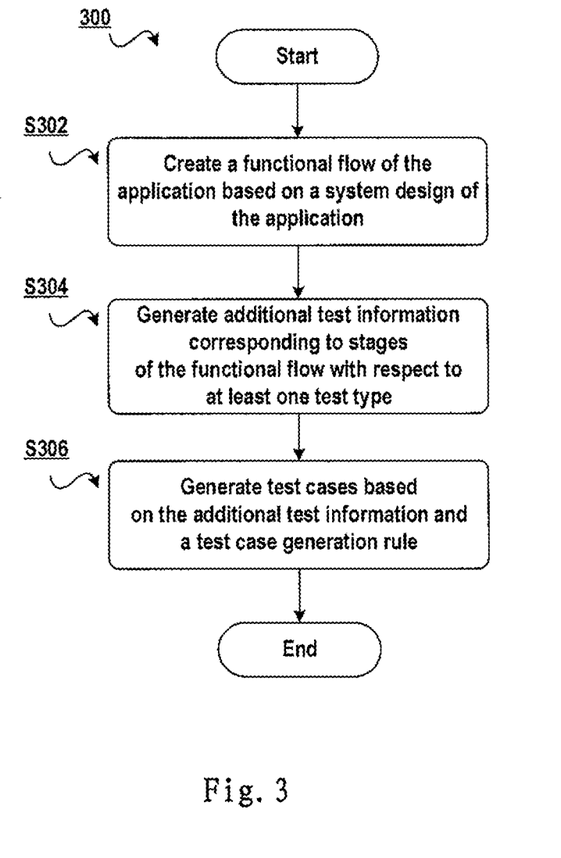
FIG. 3 schematically illustrates a flowchart of a method of generating test cases for different test types with respect to an application to be tested according to embodiments of the present invention.

Detailed description is now presented of embodiments of the present invention with reference to FIG. 3. This figure schematically illustrates a flowchart 300 of a method of generating test cases for different test types with respect to an application to be tested according to one embodiment of the present invention. In step 302, a functional flow of the application is created based on a system design of the application. A purpose of creating a functional flow comprises describing different operational branches of the application to be tested in the form of a functional flow. For example, when a user inserts a bank card into an ATM and keys in a password, two operational branches may be generated regarding whether the password is correct or wrong. In different embodiments, a functional flow may be designed from system design in different manners, which system design may comprise, for example, application program code, a standard design flow, manual inputs, etc.

It should be understood that application program code and a standard design flow are documents that completely describe functions of an application to be tested. Hence, branches of the operational flow, which describes how the application to be tested operates in many cases (including normal cases and abnormal cases such as a normal branch and an abnormal branch from a decision step), may be obtained by importing the program code or the standard design flow (e.g., described in UML). The branches of the operational flow may serve as a basis for subsequently adding additional test data. According to one embodiment, this may be implemented by importing program code and/or a standard design flow, or may further comprise manual inputs, such as manually selecting program code in combination with standard design.

In step 304, additional test information corresponding to stages of the functional flow is generated for at least one test type (e.g., a plurality of test types). Additional test information, which may be set with respect to different test types, is introduced during adding additional test information. That is, complete additional test information may represent, from different perspectives, which criteria are to be satisfied by the application to be tested in various types of tests. In step 306, test cases are generated based on the additional test information and at least one test case generation rule. In one embodiment, it is possible to specify one or more generation rules or use a default generation rule.

In one embodiment, the generating additional test information corresponding to stages of the functional flow comprises generating additional test information corresponding to stages of the functional flow based on a template associated with at least one test type. Here, a template may be defined with respect to any additional test information that is added, and the template may be configured, and subsequently stored, with respect to different test types (a function test, a system test, a performance test, a security test, a globalization test, and an accessibility test, etc.) or according to different application types.

The preceding test types are defined as follows. A function test is a test to verify whether the application/system performs its design functionality. A system test is a test to verify whether the application/system is in compliance with its specified requirements. A performance test is a test to verify whether the application/system responds to queries and/or performs its functions within a specified amount of time. A security test is a test to verify whether compliance with security requirements is satisfied. A globalization test is a test to verify whether operation of the entire integrated application/system is acceptable. An accessibility test is a test to verify whether the interface design or voice prompt of the application/system is sufficiently user-friendly and convenient for the users to use.

It is noted that, for different applications to be tested, it is unnecessary to set a template for each test type, but it is possible to customize a template with respect to these aspects of the application that are to be tested. For example, a template associated with a function test and a system test may be set for application to be tested A, while a template associated with a performance test, a security test, and a globalization test may be set for application to be tested B.

The purpose of setting a template is to unify thinking of developers while designing test cases. Further, the template may record the best practice as summarized by the test team, as a knowledge management tool for the test team to apply previously summarized test experience to new applications to be tested. In addition, the template may automatically integrate algorithms for generating test data. Further, various templates may be accumulated and enriched continuously with operations on new applications to be tested.

In one embodiment, the creating a functional flow of the application based on a system design of the application comprises abstracting the application as at least one data node, at least one activity node, and a relationship between the at least one data node and the at least one activity node.

For different test types, verification is implemented based on data or activities of the application to be tested in different cases during its running procedure. Hence, the method according to one embodiment of the present invention uses data nodes and activity nodes to describe the functional flow of an application to be tested. Please note that, when using data nodes and activity nodes to describe the functional flow of the application to be tested, a data node represents a set of data that are involved during the operational procedure of the application, and an activity node represents (i.e., denotes) an activity that advances the functional flow forward. In one embodiment, a data node further comprises a set of input data corresponding to a set of input variables. An input variable means a set of variables that are involved when the application to be tested proceeds to a certain stage. For example, when a user inserts a bank card into an ATM and keys in a password, a set of input variables may comprise {cash balance in the ATM, user's account number, password keyed in by the user}. The procedure in the above ATM example where the user inserts the card, keys in the password and makes a withdrawal may be abstracted as data nodes shown in Table 1 and activity nodes shown in Table 2. Please note that, in Table 1, the third column "Set of Input Variables" indicates input variables comprised in a data node; and in Table 2, the third column "Description" indicates an overview of an activity represented by an activity node.

TABLE 1

Data Node

| Serial Number | Node Name | Set of Input Variables |
| --- | --- | --- |
| 1 | Data 0 | {cash balance in the ATM VAR1, user's account number VAR2, password keyed in by the user VAR3} |
| 2 | Data 1-2 | {current balance VAR4, withdrawn amount which the user is allowed to key in VAR5} |
| 3 | Data 1-4 | {current balance VAR6, cash balance in the ATM VAR7} |
| 4 | Data 2-2 | {account number which the user is allowed to key in VAR2, password keyed in by the user VAR3} |

TABLE 2

Activity Node

| Serial Number | Node Name | Description |
| --- | --- | --- |
| 1 | Activity 1-1 | the ATM successfully verify the account number/password and prompts allowed operations |
| 2 | Activity 1-3 | the user makes a withdrawal from the ATM, and the current balance and the cash balance in the ATM decrease automatically |
| 3 | Activity 2-1 | the ATM fails to verify the account number/password and prompts a re-operation |
| 4 | Activity 2-3 | fail to key in a correct password for three times, and lock the card |

In one embodiment, the additional test information comprises at least one of: a set of input data corresponding to the set of input variables for at least one data node; a set of verification points for at least one data node; a set of verification points for at least activity node; an association between data nodes (if the at least one data node comprises at least two data nodes); an association between activity nodes (if the at least one data node comprises at least two data nodes); and a correlation between the set of input data and both the set of verification points for the at least one data node and the set of verification points for the at least one activity node.

In one embodiment, the at least one data node is a plurality of data nodes. In one embodiment, the at least one activity node is a plurality of activity nodes.

Detailed description is now presented of the meaning of a template and its concrete generation procedure with respect to the above types of additional test information. Since additional test information may comprise many items of content, a common template may be set for certain content, while a template associated with a test type is set for content related to this test type (e.g., a test point). An input data template for a set of input data may describe a source related to this set of input data. For example, data in the input data template for the set of input data may be obtained by: (1) ordinary data inputs (which may be divided into text, digit, etc. according to different types of input data); (2) an interface to a concrete data content file storing a subset of the set of input data (for example, while verifying whether an application to be tested satisfies multi-language support, files such as an excel document may be used to store test data that comprise different languages, as an input); (3) an interface to a data generator (for example, generating a random character string, a random number, both the random character string and the random number, etc.).

In addition, a relationship template may be defined with respect to a relationship between input data within the set of input data. For example, the relationship template includes: (1) a specified relationship between universal data variables (defining a mathematical relationship between variables, or a location relationship from a file); (2) an interface to an algorithm tool (such as an orthogonal test data preparation algorithm tool, an equivalence class test data preparation algorithm etc.). A user may select variables at different data nodes, and then a set of corresponding values for each selected variable is generated by the algorithm tool after the interface to the algorithm tool is called, wherein the set of corresponding values generated for each variable by the algorithm tool satisfies the specified relationship. Thus, the relationship template comprises (i) a specified relationship between input variables associated with the input data and (ii) an interface to an algorithm tool that generates a subset of the set of input data, said subset satisfying the specified relationship.

For example, the user selects input variables as represented in Table 3:

TABLE 3

Input Variable and Corresponding Set of Input Data

| Serial Number | Input Variable | Set of Input Data |
| --- | --- | --- |
| 1 | VAR1 | {1, 2} |
| 2 | VAR2 | {5, 6} |
| 3 | VAR6 | {7, 8} |

When it is necessary to define orthogonal data of (VAR1, VAR2, VAR6), an orthogonal test data preparation interface may be called to generate appropriate sets of input data {1, 5, 7}, {1, 6, 8}, and {2, 6, 7}.

In addition, a verification point template may be set with respect to a verification point for each test type. For example, the verification point template may comprise (1) an identification of a verification point pool for each test type (i.e., verification point pools for the different test types, such as a verification point pool for a performance test, verification point pool for a security test, a verification point pool for a function test, verification point pool for other test types, etc.), wherein a verification point in each verification point pool may be customized in advance and also may be shared by different methods for generating test cases; (2) variables related to the verification point for each test type (e.g., data node-variable name); (3) and verification relationships pertaining to the verification point for each test type.

It should be noted that it is possible to reuse experience of the test team accumulated during past tests to a great extent by setting a verification point pool, so that reference may be made when setting verification points in future. As for a verification point pool for security test, it is possible to add into the verification point pool verification points that were used in past user verification. For example, verification points may comprise: when a user inputs a password, the input password is displayed in "*"; in an interface where a user inputs a password, voice prompt is played to remind the user whether there is a stranger nearby, etc. Due to the existence of a verification point pool, during testing an ATM, it is possible to select a proper verification point template from the verification point pool without a need to repeatedly design verification points by a user. Please note that setting corresponding verification point pools for different test types helps to generate corresponding verification points for different test types in a subsequent generation step.

By referring to concrete examples of an ATM, description will be presented below on how to add additional test information into a data node as shown in Table 1 and into an activity node as shown in Table 2 by using templates associated with different test types.

1. Data Node Data 0

A set of input variables of the data node Data0 is {cash balance in the ATM VAR1, user's account number VAR2, password keyed in by the user VAR3}. When defining a set of input data, a contextual reference relationship is to establish a relationship between data and a branch, and at this point possible branches of data include: (1) the Automatic Teller Machine successfully verifies the account number/password; (2) the Automatic Teller Machine fails to verify the account number/password.

At this point, two groups of input data need to be generated: one of the groups is correct account numbers/passwords for advancing the operational flow to branch (1), and the other of the groups is wrong account numbers/passwords for advancing the operational flow to branch (2). Suppose a data file (e.g., an excel file) storing correct account numbers/passwords is pre-set, and account numbers and passwords are in two fields in the same line of this file. Branch (1) and branch (2) represent an abnormal branch and a normal branch, respectively, from a decision step of determining whether the account numbers/passwords are correct. Then, for branch (1), the above template comprises an identification of "an interface to a concrete data content file" which may be selected to obtain an account number/password, and at this point, a relationship between input variables is that the account number VAR2 and the password VAR3 come from the same line of a data file. For branch (2), the above template comprises an identification of "an interface to a data generator" which may be selected, and character strings and/or numbers generated at random are used as input data, i.e., the account number VAR2 and the password VAR3. Since two random character strings are used as respective input values for the account number and the password, it may be deemed that the account number and password generated as such might not be correct account number and password that match each other. At this point, it is possible to obtain sets of input data for account numbers/passwords in branch (1) that will pass verification and for account numbers/passwords in branch (2) that will not pass verification, respectively.

2. Activity Node Activity1-1

Description is now given to details of adding additional test information into node Activity1-1. Node Activity1-1 is an activity node; detailed description of this activity is that the ATM successfully verifies the account number/password and prompts allowed operations. At this point, verification points for a performance test and a security test may be added respectively. That is, the verification point pool for performance test is applied, from which a verification point template is selected: when there are N concurrent users, a verification response time is no longer than M seconds. At this point, it is merely necessary to fill values of M and N in the template. Meanwhile, the verification point pool for security test is applied, from which a verification point template is selected: a password input by a verified user is an invisible character string (for example, being expressed in "*").

3. Data Node Data1-2

Description is now presented of details of adding additional test information into node Data1-2. A set of input variables for data node Data1-2 is {current balance VAR4, withdrawn amount which the user is allowed to key in VAR5}. When defining a set of input data, a contextual reference relationship is to establish between currently input data and other data a relationship that meets the following criteria: in a current logical branch, current balance VAR4—withdrawn amount which the user is allowed to key in VAR5>=0, and in the current logical branch, cash balance in the ATM—withdrawn amount which the user is allowed to key in VAR5>=0. In this way, the template "an interface to a data generator" (for example, generating a random number) may be selected. Further, an additional data relationship template is "a relationship between universal data variables," such as case 1 where VAR4−VAR5>=0, and case 2 where VAR4−VAR5<0.

Since input variables on this data node comprise withdrawn amount which the user is allowed to key in VAR5, a user input is involved. Hence, when defining verification points, the verification point pool for accessibility test may further be applied, from which the following verification point template is selected: there is voice prompt during a verification operation so as to facilitate operations for the blind.

On this data node, it is further necessary to verify whether a balance before a withdrawal is equal to a current balance of an account. Hence, the template "verify related variables" may be applied to select the variable to be current balance VAR4 on data node Data1-2, and the verification value to be the current balance of a user account number of VAR2 on data node Data0.

4. Activity Node Activity1-3

Description is now presented of details of adding additional test information to node Activity1-3. Node Activity1-3 is an activity node; description of this activity is that the user makes a withdrawal from the ATM and the current balance and the cash balance in the ATM decrease. At this point, only the verification point pool for performance test is applied, from which a verification point template is selected: when there are N concurrent users, a verification response time is no longer than M seconds, and at this point it is merely necessary to fill values of M and N in the template.

5. Data Node Data1-4

This data node corresponds to a set of input data {current balance VAR6, cash balance in the ATM VAR7}. Since there is no contextual reference at this point, it is unnecessary to define a set of input data. When defining verification points, the template "verify related variables" is selected, with the variable selected to be current balance VAR6 on data node Data1-4, and the verification value selected to be current balance on data node Data1-2 VAR4 minus withdrawn amount which the user is allowed to key in VAR5.

6. Activity Node Activity2-1

This node corresponds to an activity that the ATM fails to verify the account number/password and prompts a re-operation. Like the operation for activity node Activity1-1, verification points for a performance test and a security test may be added respectively at this point. That is, the verification point pool for performance test is applied, from which a verification point template is selected: when there are N concurrent users, a verification response time is no longer than M seconds. At this point, it is merely necessary to fill values of M and N in the template. Meanwhile, the verification point pool for security test is applied, from which a verification point template is selected: a password input by a verified user is an invisible character string (for example, being expressed in "*").

7. Data Node Data2-2

This data node corresponds to a set of input variables {account number which the user is allowed to key in VAR2, password VAR3}. When defining the set of input variables, the context is that the Automatic Teller Machine fails to verify the account number/password. Hence, it is possible to select and use the template "the same variable name data" that is generated before, i.e., using variable VAR2 and variable VAR3 generated on data node Data0. Further, it is possible to select the above template "an interface to a data generator" and use randomly generated character strings as input data of account number VAR2 and password VAR3, so long as data in the set of input data are account numbers/passwords that would not pass verification. Meanwhile, the verification point pool for function test is applied, from which a verification point template is selected: verification fails.

8. Activity Node Activity2-3

This activity node corresponds to an activity that the user fails to key in a correct password for three times and the card is locked. Like the operation for activity node Activity1-1, verification points for a performance test and a security test may be added respectively at this point. That is, the verification point pool for performance test is applied, from which a verification point template is selected: when there are N concurrent users, a verification response time is no longer than M seconds. At this point, it is merely necessary to fill values of M and N in the template. Meanwhile, the verification point pool for security test is applied, from which a verification point template is selected: a password input by a verified user is an invisible character string (for example, being expressed in "*").

Description has been presented above to concrete examples of how to use templates to add additional test data for respective data nodes and activity nodes into the functional flow. Now description is presented of a relationship between a set of input data and a set of verification points.

In one embodiment, an association relationship is specified as one of: an antecedent relationship, a descendant relationship, and a concurrent relationship. Since the association relationship comprises an association between data nodes and an association between activity nodes, it is possible to specify the relationship between data nodes and further specify the relationship between sets of input data corresponding to the data nodes as an antecedent relationship, a descendant relationship, or a concurrent relationship. It may be deemed that the association relationship describes a temporal sequence relationship between data nodes and between activity nodes in concrete test cases. Such a temporal sequence may be a sequential relationship (including the antecedent relationship and the descendant relationship) or a concurrent relationship. For example, if the antecedent-descendant relationship of Data0→Data2-2→Data1-2→Data1-4 is specified, a test case is then generated as follows: a user first keys in a wrong password, subsequently keys in a correct password and finally successfully makes a withdrawal. For another example, it is possible to specify the relationship between activity nodes as one of: an antecedent relationship, a descendant relationship, and a concurrent relationship. For example, if it is specified that Activity2-1 and Activity1-1 are concurrent, then a test case is generated indicating the same user modifies the password while making a withdrawal.

In one embodiment, further comprised is specifying a correlation as one of: a verification relationship and a concurrent relationship. The verification relationship is automatically generated based on adding a verification point. For example, in order to verify current balance VAR6 on data node Data1-4, a corresponding verification value is current balance VAR4 on data node Data1-2 minus withdrawn amount VAR5 which the user is allowed to key in. In one embodiment, the system design comprises at least one of: application program code, a standard design flow, and manual inputs.

In one embodiment, the at least one test type comprises at least one of: a function test, a system test, a performance test, a security test, a globalization test, and an accessibility test. In one embodiment, the generation rule comprises at least one of: a test case type and a user-specified rule. According to another embodiment of the present invention, the test case belongs to one of: a manual test case, a static test case, and an automatic script test case. It should be noted that the user-specified rule means that the user specifies parameters for generating a test case. For example, the user may specify that each test case should contain no more than five verification points and different test cases should share no more than five steps.

It should be noted that a test case type differs from a test type. The test type refers to the above function test, system test, performance test, security test, globalization test, and accessibility test, etc., and the verification point pool may be set with respect to a different test type. However, the test case type means in which conditions a test case is used, for example, being used in a manual test of testers, in a static test, or in an automatic script test.

Figure 4:
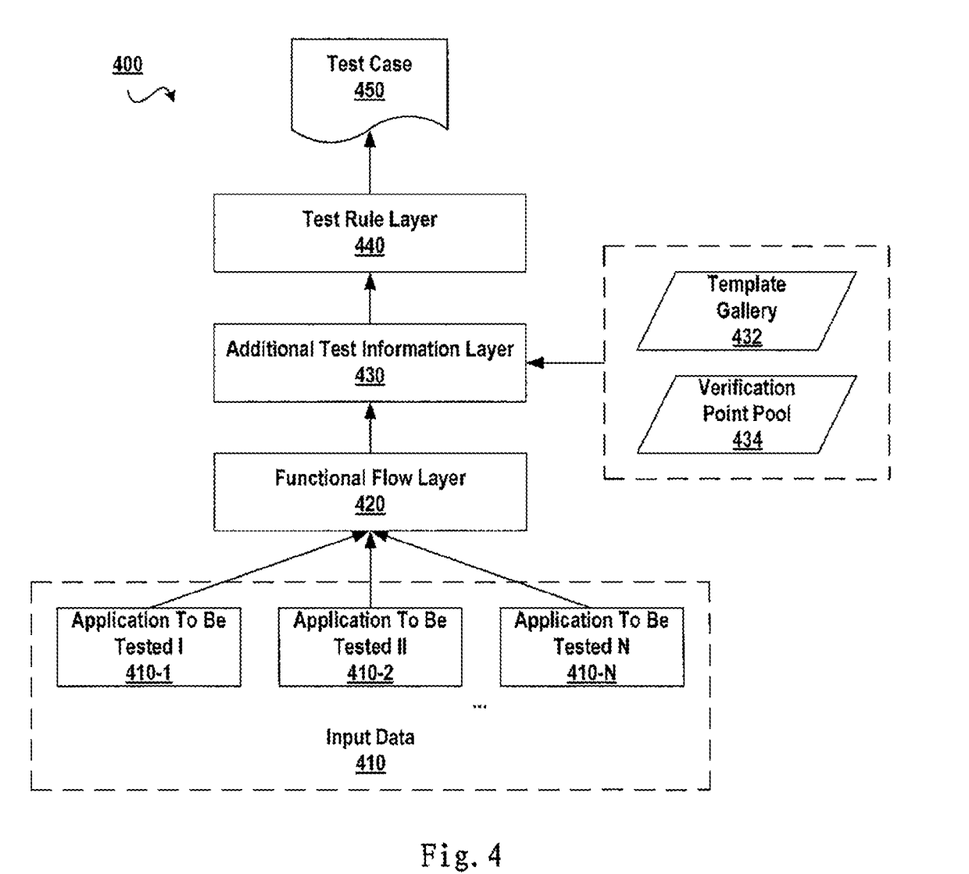
FIG. 4 schematically illustrates a data structural design view of an apparatus for generating test cases for different test types with respect to an application to be tested according to embodiments of the present invention.

Now referring to FIG. 4, this figure schematically illustrates a data structural design view 400 of an apparatus for generating test cases for different test types with respect to an application to be tested according to one embodiment of the present invention. As illustrated in FIG. 4, the apparatus according to one embodiment of the present invention is divided into three layers regarding data structural design, i.e., a functional flow layer 420, an additional test information layer 430, and a test rule layer 440. Among them, data in the functional flow layer 420 come from the application to be tested. For example, when there is a need to test an application I 410-1 to be tested, it is possible to use application program code or a standard design flow and related manual inputs of the application I 410-1 to be tested as input data. For another example, if the application to be tested is an application system that comprises a plurality of applications in a call relationship, it is further possible to use all involved applications to be tested (e.g., the application I 410-1 to be tested, an application II 410-2 to be tested, . . . , an application N 410-N to be tested) as inputs so as to generate an overall functional flow that reflects operations of the application system to be tested.

Additional test information in the additional test information layer 430 is refinement of the relationships that should be satisfied by respective steps in the functional flow generated in the functional flow layer 420. For example, related data may be selected from a template gallery 432. Finally, a test case 450 is generated based on the additional test information layer 430 and the test rule layer 440.

Figure 5:
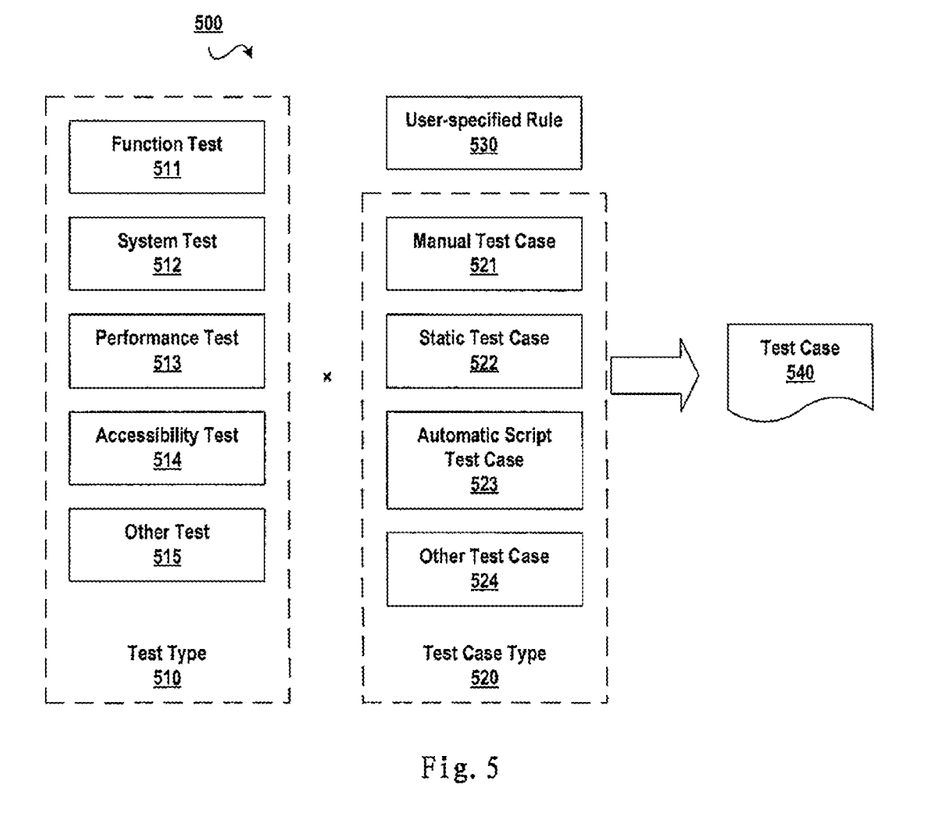
FIG. 5 illustrates a schematic view of how to generate test cases for different test types based on a generation rule according to embodiments of the present invention.

Referring to FIG. 5, this figure illustrates a schematic view 500 of how to generate test cases for different test types based on a generation rule according to one embodiment of the present invention. As is clear from the foregoing description, by using the method according to one embodiment of the present invention, test cases for different test types can be generated, wherein for different test types, additional test information regarding each step in a functional flow is added, with a plurality of templates set, and a verification point pool established. While adding additional test data, checklists for different test types may be obtained simply by selecting a verification point template from an appropriate verification point pool.

As illustrated in a block diagram 510 in FIG. 5, various test types are taken into consideration while adding additional test data (e.g., a function test 511, a system test 512, a performance test 513, an accessibility test 514, and other test type), and a test rule takes into account a user-specified rule 530 and various test case types (a manual test case 521, a static test case 522, an automatic script test case 523, and other test case 524). Hence, all these optional factors may be combined while generating a test case 540. In this manner, great flexibility is provided for generating test rules, sufficient sharing of test experience is enabled, and further it is made possible for testers to dynamically customize a test case based on a functional flow of an application to be tested.

Still referring to the above example of an ATM, detailed description is now presented of a concrete example of generating test cases that conforms to the generation rules based on additional test information and a generation rule. Meanwhile, advantages of one embodiment of the present invention as illustrated in FIG. 5 will be sufficiently illustrated in this concrete example. The user may specify a generation rule as follows: test case types comprise a manual test case, a static test case, and an automatic test case, and a user-specified rule is that each test case contains no more than five verification points and different test cases share no more than five steps (i.e., the generation rule may specify a maximum number of verification points and that different test cases share no more than a specified maximum number of steps performed by the application/system). According to one embodiment of the present invention, test cases as illustrated in Tables 4-6 will be generated automatically.

TABLE 4

Test Case 1

1. Manual Test Case

Step 1: a cash balance in an Automatic Teller Machine is RMB 200,000, and
user A keys in an account number of 123123 and a password of 123123;
Step 2: the Automatic Teller Machine verifies the account number
and the password; Verification Point:
   Security test: the password keyed in by the user should be displayed in encryption;
   Performance test: a system response time is no longer than five seconds;
Step 3: the system displays that a current balance of the card is RMB 5,000,
and the user keys in a withdrawn amount of RMB 1,000;
Verification point:
   Function test: a current balance of the card is RMB 5,000;
Step 4: the user presses a withdraw button;
Verification point:
   Function test: the system response time is no longer than five seconds;
Step 5: the system displays the a current balance of the card is RMB 4,000;
Verification point:
   Function test: a current balance of the card is RMB 4,000.

TABLE 5

Test Case 2

2. Static Test Case

Performance test verification point on Activity1-1: an
application to be tested makes an error at this verification point;
Solution: add an application server buffer pool;
Best practice regarding this performance verification point
in the industry: add an application server memory.

TABLE 6

Test Case 3

3. Automatic Script Test Case (Regarding the Manual Test Case in Table 1)

Generate description files for keywords in the manual test case, i.e.,
"user input, system display, verify, press", etc., and map them to
corresponding operations of different automatic test tools;
Associate the user input or a value displayed by the system with a variable;
Extract symbols following such keywords as press, and map
them to corresponding operational objects of different automatic test tools.

It should be noted that the generated test cases may be decomposed and/or combined. According to one embodiment, one test case comprising more steps may be decomposed into a plurality of test cases each comprising fewer steps. For example, regarding the following test case: a user first keys in a wrong password, then keys in a correct password and successfully makes a withdrawal, it may be decomposed into two test cases: (1) a user keys in a wrong password, and (2) a user keys in a correct password and successfully makes a withdrawal. According to another embodiment, these two separate test cases may be combined into one test case.

Figure 6:
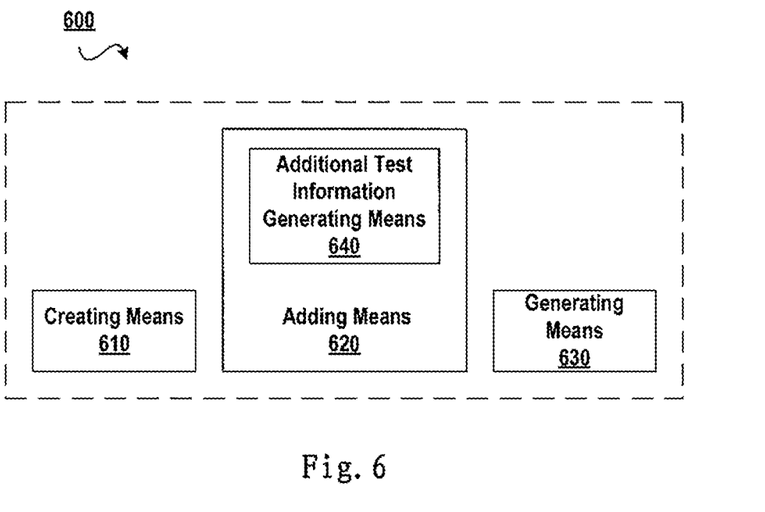
FIG. 6 schematically illustrates a block diagram of an apparatus for generating test cases for different test types with respect to an application to be tested according to embodiments of the present invention.

Referring to FIG. 6, this figure schematically illustrates a block diagram of an apparatus 600 for generating test cases for different test types with respect to an application to be tested according to one embodiment of the present invention. The data structural design view in FIG. 6 corresponds to that in FIG. 4 and illustrates the construction of the apparatus 600 from the perspective of a function performed by each module in this apparatus.

In one embodiment, there is provided an apparatus 600 for generating test cases for an application. The apparatus 600 comprises: creating means 610 configured to create a functional flow of the application based on a system design of the application; adding means 620 configured to generate additional test information corresponding to stages of the functional flow based on at least one test type (e.g., a plurality of test types); and generating means 630 configured to generate test cases based on the additional test information and a test case generation rule.

In another embodiment, the means for generating additional test information corresponding to stages of the functional flow comprises means for generating additional test information corresponding to stages of the functional flow based on a template associated with at least one test type.

In another embodiment, the means configured to create a functional flow of the application based on a system design of the application comprises means configured to abstract the application as at least one data node, at least one activity node, and a relationship between the at least data node and the at least one activity node.

In another embodiment, the additional test information comprises at least one of: a set of input data for the at least one data node; a set of verification points for the at least one data node; a set of verification points for the at least one activity node; an association relationship between the at least one data node; an association relationship between the at least one activity node; and a correlation between the set of input data and the set of verification points.

In another embodiment, further comprised is means configured to specify the association relationship as one of: an antecedent relationship, a descendant relationship, and a concurrent relationship.

In another embodiment, further comprised is means configured to specify the correlation as one of: a verification relationship and a concurrent relationship.

In another embodiment, the system design comprises at least one of: application program code, a standard design flow, and manual inputs.

In another embodiment, the at least one test type comprises one of: a function test, a system test, a performance test, a security test, a globalization test, and an accessibility test.

In another embodiment, the generation rule comprises at least one of: a test case type and a user-specified rule.

In another embodiment, the test case belongs to one of the following types: manual test cases, static test cases, and automatic script test cases.

Compared with the prior art, embodiments of the present invention have below advantages: standardizing the operational flow of the test team, reusing accumulated experience of the test team during past tests, and associating test cases for different test types.

The present invention can be embodied in full hardware, full software, or a form comprising both hardware components and software components. In a preferred embodiment, the present invention is implemented as software, including, without limitation to, firmware, resident software, microcode, etc.

Moreover, the present invention may be implemented as a computer program product comprising computer-readable media or storage devices that store program code for use by or in connection with a computer or any instruction executing data processing system. For the purpose of description, a computer-usable or computer-readable medium or storage device may be any physically tangible medium or storage device that can store the program code for use by or in connection with an instruction execution data processing system, apparatus, or device.

The medium or storage device may be an electric, magnetic, optical, electromagnetic, infrared, or semiconductor system (apparatus or device). Examples of the computer-readable medium or device may include the following: a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CR-ROM), and DVD.

A data processing system adapted for storing or executing program code would include at least one processor that is coupled to a memory element directly or via a system bus. The memory element may include a local memory usable during actually executing the program code, a mass memory, and a cache that provides temporary storage for at least one portion of program code so as to decrease the number of times for retrieving code from the mass memory during execution.

An Input/Output or I/O device (including, without limitation to, a keyboard, a display, a pointing device, etc.) may be coupled to the system directly or via an intermediate I/O controller.

A network adapter may also be coupled to the system such that the data processing system can be coupled to other data processing systems, remote printers or storage devices via an intermediate private or public network. A modem, a cable modem, and an Ethernet card are merely examples of a currently available network adapter.

It should be understood from the foregoing description that modifications and alterations may be made to respective embodiments of the present invention without departing from the true spirit of the present invention. The description in the present specification is intended to be illustrative and not limiting. The scope of the present invention is limited by the appended claims only.

What is claimed is:

1. A method for generating test cases of different types for testing an application, comprising:
    creating, by a processor of a data processing system, a functional flow of the application based on a system design of the application;
    said processor generating additional test information corresponding to different stages of the functional flow with respect to a plurality of test types; and
    said processor generating the test cases of different types for testing the application, said generating the test cases being based on the additional test information and at least one test case generation rule, wherein the at least one test case generation rule comprises a generation rule that specifies a maximum number of verification points and that different test cases share no more than a specified maximum number of steps performed by the application.

2. The method of claim 1, wherein said creating a functional flow of the application comprises creating a functional flow with respect to operational branches of the application, wherein one operation branch of the operational branches includes a normal branch and an abnormal branch from a decision step.

3. The method of claim 1, said test cases of different types being associated with one another.

4. The method of claim 1,
    wherein said creating a functional flow of the application comprises specifying at least one data node pertaining to the application, specifying at least one activity node pertaining to the application, and specifying a relationship between the at least one data node and the at least one activity node;
    wherein the at least one data node comprises a set of input data; and
    wherein each activity node denotes an activity that advances the functional flow forward.

5. The method of claim 4, said processor generating the additional test information comprising utilizing templates associated with the test types of the plurality of test types.

6. The method of claim 5, wherein the templates comprise an input data template for the set of input data, wherein the input data template comprises (i) an identification of an interface to a concrete data content file storing a first subset of the set of input data and (ii) an interface to a data generator that generates random numbers and/or random character strings to generate a second subset of the set of input data.

7. The method of claim 5, wherein the templates comprise a relationship template for the set of input data, wherein the relationship template comprises (i) a specified relationship between input variables associated with the input data and (ii) (2) an interface to an algorithm tool that generates a subset of the set of input data, said subset satisfying the specified relationship.

8. The method of claim 5, wherein the templates comprise a verification point template with respect to a verification point for each test type, wherein the verification point template comprises (i) an identification of a verification point pool for each test type such that the verification point for each test type are shared by different methods for said generating the test cases, (ii) variables related to the verification point for each test type, and (iii) verification relationships pertaining to the verification point for each test type.

9. The method of claim 5,
    wherein the at least one data node comprises a plurality of data nodes;
    wherein the at least one activity node comprises a plurality of activity nodes; and
    wherein the additional test information comprises the set of input data, a set of verification points for the plurality of data nodes, a set of verification points for the plurality of activity nodes, an association relationship among the data nodes of the plurality of data nodes, an association relationship among the activity nodes of the plurality of activity nodes; and a correlation between the set of input data and both the set of verification points for the plurality of data nodes and the set of verification points for the plurality of activity nodes.

10. A data processing system comprising a processor, a memory coupled to the processor, and a computer readable storage device containing program code configured to be executed by the processor via the memory to implement a method for generating test cases of different types for testing an application, said method comprising:
    said processor creating a functional flow of the application based on a system design of the application;
    said processor generating additional test information corresponding to different stages of the functional flow with respect to a plurality of test types; and
    said processor generating the test cases of different types for testing the application, said generating the test cases being based on the additional test information and at least one test case generation rule, wherein the at least one test case generation rule comprises a generation rule that specifies a maximum number of verification points and that different test cases share no more than a specified maximum number of steps performed by the application.

11. The data processing system of claim 10, wherein said creating a functional flow of the application comprises creating a functional flow with respect to operational branches of the application, wherein one operation branch of the operational branches includes a normal branch and an abnormal branch from a decision step.

12. The data processing system of claim 10, said test cases of different types being associated with one another.

13. The data processing system of claim 10,
    wherein said creating a functional flow of the application comprises specifying at least one data node pertaining to the application, specifying at least one activity node pertaining to the application, and specifying a relationship between the at least one data node and the at least one activity node;
    wherein the at least one data node comprises a set of input data; and wherein each activity node denotes an activity that advances the functional flow forward.

14. A computer program product, comprising a computer readable hardware storage device having computer readable program code stored therein, said program code configured to be executed by a processor of a data processing system to implement a method for generating test cases of different types for testing an application, said method comprising:

said processor creating a functional flow of the application based on a system design of the application;

said processor generating additional test information corresponding to different stages of the functional flow with respect to a plurality of test types; and said processor generating the test cases of different types for testing the application, said generating the test cases being based on the additional test information and at least one test case generation rule, wherein the at least one test case generation rule comprises a generation rule that specifies a maximum number of verification points and that different test cases share no more than a specified maximum number of steps performed by the application.

15. The computer program product of claim 14, wherein said creating a functional flow of the application comprises creating a functional flow with respect to operational branches of the application, wherein one operation branch of the operational branches includes a normal branch and an abnormal branch from a decision step.

16. The computer program product of claim 14, said test cases of different types being associated with one another.

17. The computer program product of claim 14, wherein said creating a functional flow of the application comprises specifying at least one data node pertaining to the application, specifying at least one activity node pertaining to the application, and specifying a relationship between the at least one data node and the at least one activity node;

wherein the at least one data node comprises a set of input data; and wherein each activity node denotes an activity that advances the functional flow forward.

* * * * *